E. STEIGER.
PNEUMATIC SPEED AND DISTANCE INDICATOR.
APPLICATION FILED MAR. 25, 1914.
1,192,702.   Patented July 25, 1916.
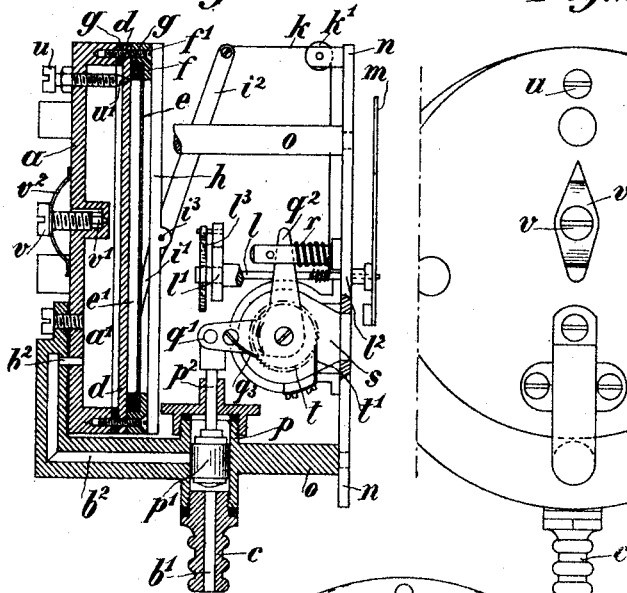
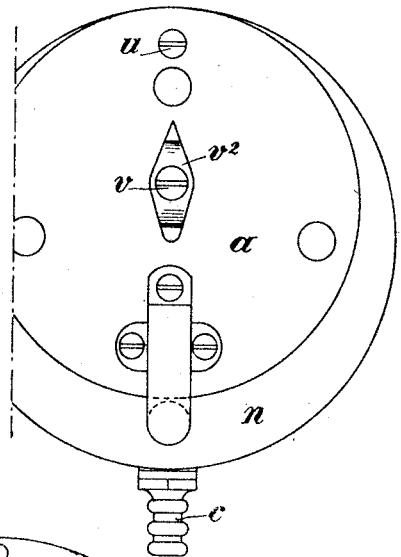
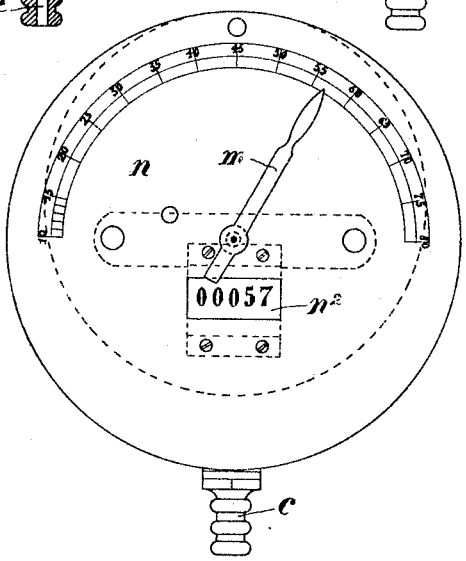
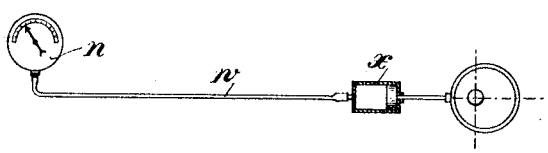

UNITED STATES PATENT OFFICE.

EUGEN STEIGER, OF ZURICH, SWITZERLAND, ASSIGNOR TO JOHANN NIELSEN JEBSEN, OF ZURICH, SWITZERLAND, AND JOHANN CHRISTIAN BUOL, OF DAVOS, SWITZERLAND.

PNEUMATIC SPEED AND DISTANCE INDICATOR.

1,192,702. Specification of Letters Patent. Patented July 25, 1916.

Application filed March 25, 1914. Serial No. 827,221.

*To all whom it may concern:*

Be it known that I, EUGEN STEIGER, citizen of Switzerland, residing at Zurich, in the Canton of Zurich, Switzerland, have invented certain new and useful Improvements in Pneumatic Speed and Distance Indicators for Motor-Driven Vehicles; and I do hereby declare the following to be a full, clear, and exact description of the invention, such as will enable others skilled in the art to which it appertains to make and use the same.

This invention relates to improvements in pneumatic speed indicators for motor driven vehicles and has for its object to provide means whereby such indicators are rendered more reliable in action, considerably simplified and thus rendered cheaper to produce, the moving parts are as much as possible prevented from wearing and the mechanical transmission from the driving member to the indicator is dispensed with. I attain this object by the mechanism illustrated in the accompanying sheet of drawing which shows one embodiment of my invention and in which—

Figure 1 is a side view partly in section, Fig. 2 a back view, and Fig. 3 a front view of the indicator, while Fig. 4 shows diagrammatically the connection between the indicator and the pulsator (piston pump).

Similar letters refer to similar parts throughout the several views.

Referring to the drawings, $a$ is an air chamber with which is connected an air-inlet passage $b'$, $b^2$ having a hose nozzle $c$, which passage communicates with the air space $a'$ of the said air chamber.

$d$ is a partition and $e$ a diaphragm, which by means of a ring $f$, screws $f'$ and packing $g$ are secured upon the air chamber $a$. Between the partition $d$ and the diaphragm $e$ an air space $e'$ is also provided. The ring $f$ has a bridge $h$ to which at $i^3$, a lever $i'$, $i^2$ is pivoted, the shorter arm $i'$ of which bears upon the diaphragm $e$, while to the longer arm $i^2$ is secured a pull member $k$ (thread), which passing over a guide pulley $k'$, has its other end secured to a spindle 1, mounted in bearings $l'$, $l^2$, to be wound on and off the same. The spindle $l$ carries a speed indicating finger $m$ adapted to oscillate over a dial $n$ which by means of distance bolts $o$ is secured to the air chamber $a$. On the spindle $l$ is also arranged a spiral spring $l^3$ which tends to turn the same in a direction opposite to the pull exerted by the said member.

The air inlet passage $b'$, $b^2$ branches from a cylinder $p$ in which is a piston $p'$, which is so placed under the influence of a spring that the piston $p'$ will be pressed downward. The piston $p'$ is adapted to alternately admit air pressure from the said pulsator into the chamber $a$ and to cut off the same therein. If desirable a distance counter may be combined with and operated from the piston $p'$ as follows:—The piston rod $p^2$ is connected with an angular lever $q$, $q^2$, the arm $q^2$ of which is placed under the influence of a coiled spring $r$ which tends to press the piston $p'$ downward. The angular lever $q'$, $q^2$ is loosely mounted upon the shaft of the distance counter $s$ and carries a feed pawl $q^3$ (spring) which engages in a ratchet wheel $t$ secured upon the said counter shaft and in which engages a back pawl $t'$ (spring). The dial $n$ has an aperture $n^2$ through which the figures of the distance counter can be read.

Through the wall of the air receptacle $a$ extends a screw $u$ provided with a lock nut and having a coned end which projects into a hole formed in the partition $d$ and by means of which the said hole can be more or less closed (reduced). The wall of the air receptacle $a$ has a screw $v$ having a coned end by means of which at $v'$ an outlet hole may be more or less opened. A spring $v^2$ serves for holding the said screw $v$ in position.

The nozzle $c$ is connected with the pulsator $x$ by means of a hose $w$ (Fig. 4), while the pulsator is actuated from one of the wheel axles of the vehicle, the piston making one stroke during each revolution of the wheels.

The action of the device described is as follows:—The compressed air is forced into the air space $a'$ through the air inlet passage $b'$, $b^2$ which causes the piston $p'$ to be raised and transmit motion to the feed $q'$, $q^3$ and $t$ and the latter to actuate the distance counter one tooth during each stroke of the piston of the pulsator $x$ or piston $p'$, while the return of the piston $p'$ takes place with the return of the piston of the pulsator $x$ aided by the coiled spring $r$. This operation is repeated during each stroke of the piston of the pulsator $x$ each stroke corresponding with one revolution of the vehicle wheels, whereby the number of revolutions of the vehicle wheels or the distance covered is imparted to the said counter. The piston $p'$ also serves as a piston valve, because when it descends, it cuts off the air passage $b^2$ and therefore prevents the air escaping from it. According to the rapidity with which the strokes of the pump piston follow each other, a larger or smaller pressure is created in the air space $a'$ which pressure is also communicated to the interior of the air space $e'$ by means of the opening $u'$ which causes the diaphragm $e$ to bulge out more or less and which variations are imparted to the angular lever $i'$, $i^2$ by means of the pull member $k$ and transmitted to the speed indicating finger spindle $l$.

When the pressure ceases the diaphragm $e$ and thus the levers $i'$, $i^2$ return, the coiled spring $l^3$ causes the spindle $l$ and thus the speed indicating finger $m$ to also return and keep the pull member $k$ in each position tight, whereby the lever arm $i'$ is pressed against the diaphragm $e$. By throttling the air at $u'$ by means of the screw $u$, air shocks in the air space $e$ and thus vibrations of the diaphragm $e$ and the speed indicating finger $m$ are reduced to a minimum, which throttling constitutes an important part of my invention, because the indication takes place steadily without the use of wind vessels and the like, and whereby the indicator is rendered compact and reliable.

By regulating the air exit at $v'$ by means of the screw $v$, the minimum and maximum pressure in the air space $a'$ and thereby the speed indicating finger, the position and the movement of the latter can be varied at will, which, for instance, with regards to the various diameter of vehicle wheels, is of particular importance as such saves complicated alterations in the drive and the like.

I claim:

1. A pneumatic speed indicator for motor driven vehicles, comprising a dial and finger for indicating the speed, an air chamber one side of which has an air outlet port and the other side of which forms a diaphragm, a partition dividing the said chamber into two compartments and having a port connecting the said compartments together, a cylinder connected with a pulsator actuated from the vehicle axle, a passage leading from the said cylinder to the said air chamber, a piston in the said cylinder adapted to alternately admit air pressure from the said pulsator into the said chamber and cut off the same therein to actuate the said diaphragm and means between the said diaphragm and the said indicating finger for transmitting motion from the said diaphragm to the said finger on each revolution of the vehicle wheel, substantially as set forth.

2. A pneumatic speed indicator for motor driven vehicles, comprising a dial and finger for indicating the speed, an air chamber one side of which has an air outlet port and the other side of which forms a diaphragm, a partition dividing the said chamber into two compartments and having a port connecting the said compartments together, a cylinder connected with a pulsator actuated from the vehicle axle, a passage leading from the said cylinder to the said air chamber, a piston in the said cylinder adapted to alternately admit air pressure from the said pulsator into the said chamber and cut off the same therein to actuate the said diaphragm, means between the said diaphragm and the said indicating finger for transmitting motion from the said diaphragm to the said finger on each revolution of the vehicle wheel and adjustable means for controlling the passage of the air through the said ports to more or less throttle the same, substantially as set forth.

In testimony whereof I have affixed signature in presence of two witnesses.

EUGEN STEIGER.

Witnesses:
J. N. JEBSEN,
CARL CARLSEN.

Copies of this patent may be obtained for five cents each, by addressing the "Commissioner of Patents, Washington, D. C."